United States Patent
Boyapalle et al.

(10) Patent No.: US 9,846,640 B2
(45) Date of Patent: Dec. 19, 2017

(54) SYSTEM AND METHOD FOR RETRIEVING WIRELESS ACCESS POINT CREDENTIALS FROM A BIOS NVRAM

(71) Applicant: Dell Products, LP, Round Rock, TX (US)

(72) Inventors: Anantha Boyapalle, Austin, TX (US); Yuan-Chang Lo, Austin, TX (US); Todd E. Swierk, Austin, TX (US); Carlton A. Andrews, Austin, TX (US)

(73) Assignee: DELL PRODUCTS, LP, Round Rock, TX (US)

( * ) Notice: Subject to any disclaimer, the term of this patent is extended or adjusted under 35 U.S.C. 154(b) by 64 days.

(21) Appl. No.: 14/693,233

(22) Filed: Apr. 22, 2015

(65) Prior Publication Data

US 2016/0316370 A1   Oct. 27, 2016

(51) Int. Cl.
| | | |
|---|---|---|
| *G06F 12/02* | (2006.01) |
| *H04W 84/12* | (2009.01) |
| *G06F 9/44* | (2006.01) |
| *G06F 9/445* | (2006.01) |
| *H04W 12/04* | (2009.01) |
| *G06F 11/14* | (2006.01) |
| *H04L 29/08* | (2006.01) |

(52) U.S. Cl.
CPC ........ *G06F 12/0238* (2013.01); *G06F 9/4401* (2013.01); *G06F 9/4416* (2013.01); *G06F 9/44505* (2013.01); *G06F 11/1417* (2013.01); *H04W 12/04* (2013.01); *G06F 11/1433* (2013.01); *G06F 2212/202* (2013.01); *H04L 67/34* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 6,862,609 B2 | 3/2005 | Merkey | |
| 9,110,679 B1* | 8/2015 | Chan | G06F 9/4411 |
| 2003/0041211 A1 | 2/2003 | Merkey et al. | |
| 2005/0059396 A1* | 3/2005 | Chuah | H04W 24/02 |
| | | | 455/435.1 |
| 2007/0079359 A1* | 4/2007 | Lagnado | G06F 21/575 |
| | | | 726/4 |
| 2007/0189321 A1* | 8/2007 | Lee | H04L 12/2803 |
| | | | 370/445 |
| 2008/0198823 A1* | 8/2008 | Shiu | H04W 48/20 |
| | | | 370/338 |
| 2012/0076069 A1* | 3/2012 | Ogura | H04W 60/04 |
| | | | 370/315 |

(Continued)

OTHER PUBLICATIONS

"Intel® Active Management Technology, Query, Restore, Upgrade, and Protect Devices Remotely," http://www.intel.com/content/www/us/en/architecture-and-technology/intel-active-management-technology.html.

(Continued)

*Primary Examiner* — Nitin Patel
*Assistant Examiner* — Danny Chan
(74) *Attorney, Agent, or Firm* — Larson Newman, LLP

(57) ABSTRACT

A wireless access point profile is retrieved from a basic input output system (BIOS) non-volatile random-access memory (NVRAM). The wireless access point profile is provided to a wireless local area network controller.

11 Claims, 5 Drawing Sheets

(56) References Cited

U.S. PATENT DOCUMENTS

2013/0311763 A1* 11/2013 Saborowski ............ G06F 9/445
713/2
2015/0278510 A1* 10/2015 Alexander .............. G06F 21/45
726/6

OTHER PUBLICATIONS

"Intel® Active Management Technology Configuration Utility User Guide," Version 8.2, Mar. 7, 2013, 117 pgs., http://www.intel.com/content/dam/www/public/us/en/documents/guides/amt-configuration-utility-user-guide.pdf.

"Windows Connect Now (WCN)," Microsoft Windows, pp. 2015, 1-3, http://windows.microsoft.com/en-us/windows7/products/features/windows-connect-now.

"Security made easy: Wi-Fi Protected Setup™; Certified Protected Setup™," Wi-Fi Security Alliance, 2014, pp. 1-4, http://www.wi-fi.org/discover-wi-fi/security.

* cited by examiner

US 9,846,640 B2

SYSTEM AND METHOD FOR RETRIEVING WIRELESS ACCESS POINT CREDENTIALS FROM A BIOS NVRAM

FIELD OF THE DISCLOSURE

This disclosure relates generally to information handling systems, and more particularly relates to retrieving wireless access point profiles from a BIOS NVRAM.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

FIGS. 1-5 illustrate techniques for automatically configuring operation of a wireless local area network (WLAN) interface during an initial boot of an operating system (OS) at an information handling system. For example, information identifying a wireless access point and login credentials can be stored at a non-volatile random access memory (NVRAM) that stores a basic input/output system (BIOS). If a hardware or software failure necessitates reinstallation of the OS, the wireless access point information can be retrieved from the BIOS NVRAM during an initial boot of the freshly installed OS. The BIOS firmware can automatically configure operation of the WLAN interface using the retrieved information. Alternatively, a service OS or recovery agent can be included at an information handling system to provide system recovery or diagnostic services. The service OS can retrieve the wireless access point information and configure operation of the WLAN interface, thereby enabling access to network resources, such as diagnostic services available on the Internet.

In one embodiment, the wireless access point information can be automatically stored at the BIOS NVRAM following configuration of the WLAN interface by a user of the information handling system. For example, a service program initialized by BIOS firmware can monitor operation of the information handling system, and identify when a user of the system is utilizing a WLAN configuration manager to set up operation of the WLAN interface. The service program can then store the wireless access point configuration information at the BIOS NVRAM. As used herein, a WLAN interface communicates over a radio frequency link with a wireless access point. This wireless data communication system is typically compliant with one or more standards, such as the local area wireless technology standard promulgated by the Wi-Fi Alliance. Data communicated over the network is typically encrypted. Accordingly, the WLAN controller is provided with wireless access point configuration information including a name identifying the wireless access point and credentials, such as a password, an encryption key, a certificate, and the like.

Figure 1:
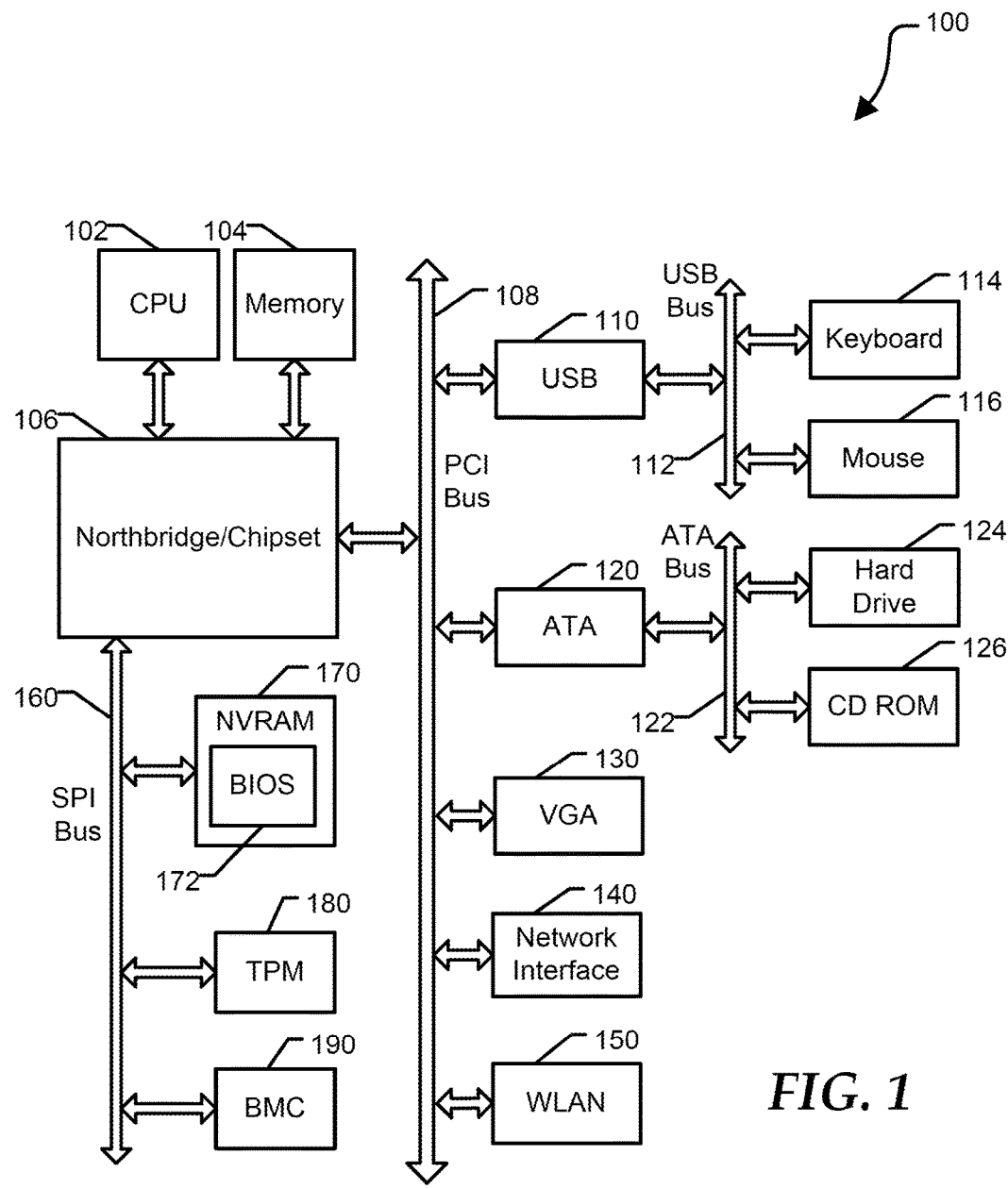
FIG. 1 is a block diagram of an information handling system according to an embodiment of the present disclosure.

FIG. 1 illustrates an information handling system 100 including a processor 102, a memory 104, a northbridge/chipset 106, a PCI bus 108, a universal serial bus (USB) controller 110, a USB bus 112, a keyboard device controller 114, a mouse device controller 116, an ATA bus controller 120, an ATA bus 122, a hard drive device controller 124, a compact disk read only memory (CD ROM) device controller 126, a video graphics array (VGA) device controller 130, a network interface controller (NIC) 140, a wireless local area network (WLAN) controller 150, a serial peripheral interface (SPI) bus 160, a non-volatile random access memory (NVRAM) 170 for storing a basic input/output system (BIOS) 172, a trusted platform module (TPM) 180, and a baseboard management controller (BMC) 190. Information handling system 100 can include additional components and additional busses, not shown for clarity. For example, system 100 can include multiple processor cores, audio devices, and the like. While a particular arrangement of bus technologies and interconnections is illustrated for the purpose of example, one of skill will appreciate that the techniques disclosed herein are applicable to other system architectures. System 100 can include multiple CPUs and redundant bus controllers. One ore more components can be integrated together. For example, portions of northbridge/chipset 106 can be integrated within CPU 102.

For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as CPU 102, a programmable logic array (PLA), an embedded device such as a System-on-a-Chip (SoC), or other control logic hardware. Information handling system 100 can also include one or more computer-readable medium for storing machine-executable code, such as software or data.

BIOS 172 can be referred to as a firmware image, and the term BIOS is herein used interchangeably with the term firmware image, or simply firmware. BIOS 172 includes instructions executable by CPU 102 to initialize and test the hardware components of system 100, and to load a boot loader or an operating system (OS) from a mass storage device. BIOS 172 additionally provides an abstraction layer for the hardware, i.e. a consistent way for application programs and operating systems to interact with devices, such as a keyboard, a display, and other input/output devices. When power is first applied to information handling system 100, the system begins a sequence of initialization procedures. During the initialization sequence, also referred to as a boot sequence, components of system 100 are configured and enabled for operation, and device drivers can be installed. Device drivers provide an interface through which other components of the system 100 can communicate with a corresponding device.

In an embodiment, the BIOS 172 can be substantially compliant with one or more revisions of the UEFI specification. The UEFI standard replaces the antiquated personal computer BIOS system found in some older information handling systems. The UEFI specification provides standard interfaces and interoperability guidelines for devices that together make up an information handling system. In particular, the UEFI specification provides a standardized architecture and data structures to manage initialization and configuration of devices, booting of platform resources, and passing of control to the operating system. The UEFI specification allows for the extension of platform firmware by loading UEFI driver and UEFI application images. For example, an original equipment manufacturer can include customized or proprietary images to provide enhanced control and management of the information handling system 100. While the techniques disclosed herein are described in the context of a UEFI compliant system, one of skill will appreciate that the disclosed systems and methods can be implemented at substantially any information handling system having firmware.

Figure 2:
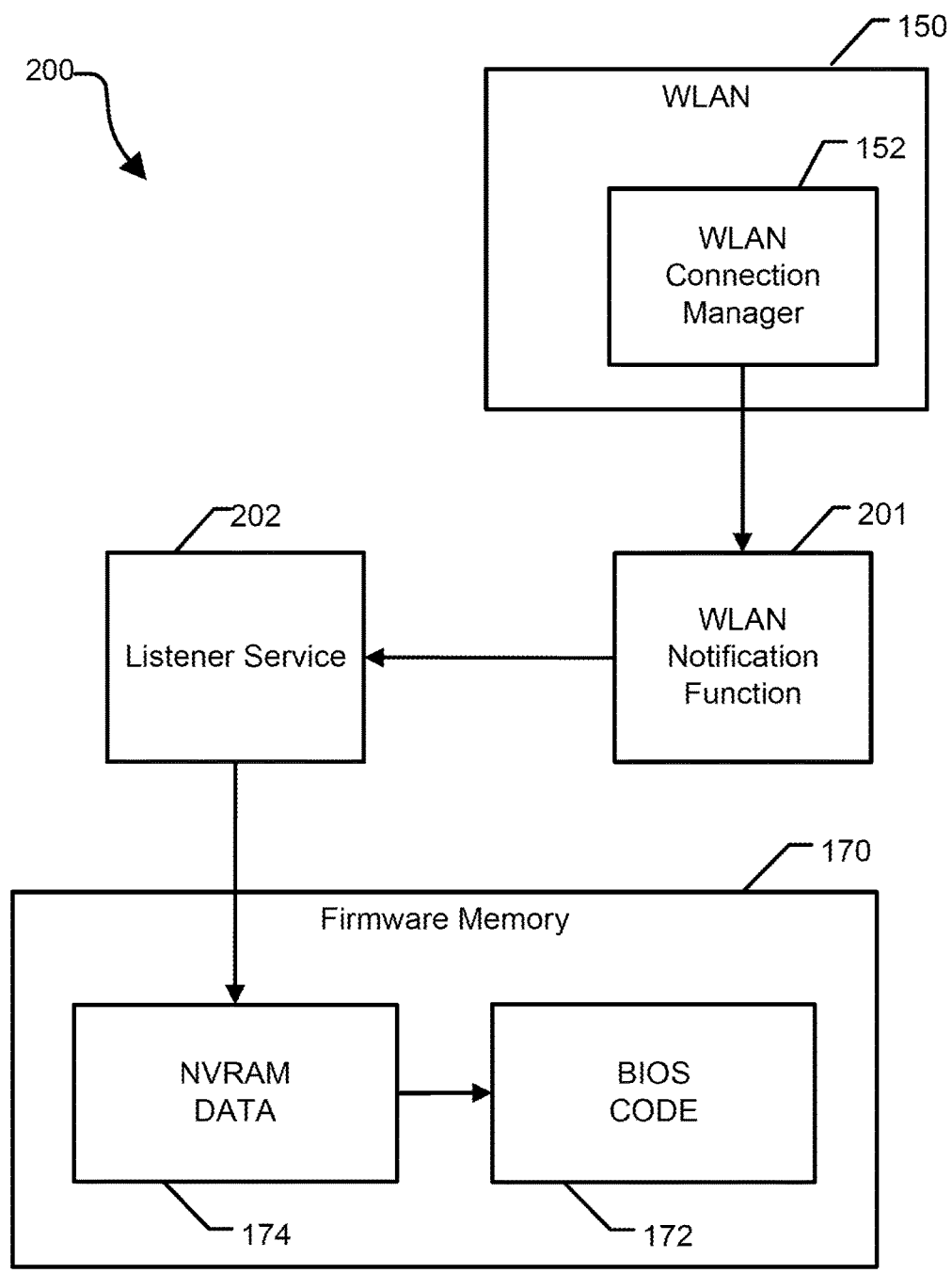
FIG. 2 is a block diagram of a system for storing and accessing WLAN information at a system BIOS NVRAM according to a specific embodiment of the present disclosure.

FIG. 2 is a block diagram of a system 200 for storing and accessing WLAN information at a system BIOS NVRAM according to a specific embodiment of the present disclosure. System 200 includes WLAN controller 150, a WLAN notification function 201, a listener service 202, and NVRAM 170. WLAN controller 150 includes a WLAN connection manager 152, and NVRAM 170 includes BIOS code 172 and NVRAM data 174. NVRAM data 174 is a region of NVRAM 170 that is reserved for storing information. For example, an original equipment manufacturer (OEM) can store status, configuration, diagnostic, and other information at NVRAM data region 174, and this information can be available to BIOS firmware 172 and also available to runtime applications executing under control of the OS.

Access to NVRAM data 174 is typically administered in response to a software system management interrupt (SMI). A SMI causes processor 102 to transition to a system management mode (SMM). SMM is an operating mode in which all normal execution, including the OS is suspended, and special software is executed in a high-privilege mode. SMM typically supports power management, system hardware control, or proprietary OEM program code. SMM provides an isolated processor environment that operates transparently to the OS and software applications. SMM can only be entered in response to an SMI, which can be either hardware or software generated. A software-generated SMI is typically initiated by a write access to a specific input/output (I/O) port or memory location. Current processor state must be saved at a reserved portion of system memory 104, known as system management RAM (SMRAM) before the SMI can be serviced. System 100 includes software to process SMIs and to dispatch service to an appropriate handling routine based on the source of the interrupt.

During operation of information handling system 100, a user can utilize a graphical user interface (GUI) provided by system 100 to setup and configure operation of WLAN controller 150. For example, the GUI can identify one or more wireless networks having signals that can be received at WLAN 150. Each wireless network can be identified by an associated service set identification (SSID) name, or similar identifier. A user can select a desired wireless network from the provided list and enter suitable log-in credentials, such as a password, a Wired Equivalent Privacy (WEP) key, a Wi-Fi Protected Access (WPA) key, or another type of network security encryption key. As used here, a wireless profile includes configuration information required to communicate with the access point. The profile typically includes a name of a wireless access point, security credentials, a Wi-Fi access certificate, and the like.

In one embodiment, the OS can provide a notification subscription service, such as WLAN notification function 201 to notify a subscriber when WLAN 150 is being configured. For example, the Windows operating system provides a WlanRegisterNotification function that permits an application, such as listener service 202, to register and unregister notification for wireless interfaces. Listener service 202 can be initiated during the boot process at information handling system 100 and remain resident after control of system 100 is handed off to the primary operating system at the end of the boot process. Listener 100 can register with the OS function to receive a notification of user access configuration of an 802.11 or similar standard or proprietary wireless interface. For example, each time a user of system 100 utilizes WLAN connection manager 152 to configure WLAN controller 150, WLAN notification function 201 can alert listener service 202. Listener service 202 can issue a request to obtain the setup information provided by the user. For example, listener service 202 can utilize the Windows WlanGetProfile function to request all information about a specified wireless profile. Listener service 202 can store the information at NVRAM data 174. Accordingly, software, such as BIOS code 172, can access the wireless profile stored at NVRAM data 174 to enable communications over the WLAN network in an event that the primary OS is reinstalled, a supervisor or recovery OS is initialized, or by another program that requires access to a resource accessible over a wireless network interface.

While system 200 is described in the context of a Microsoft Windows-compliant operating system and Wi-Fi-compliant wireless communication, one of skill will appreciate that the techniques described herein are equally applicable to information handling systems compliant with another operating system, including a proprietary operating system. Furthermore, the disclosed techniques are applicable to any wireless network technology that utilizes login credentials or a network identifier to gain access to the network or a device. For example, techniques disclosed herein are equally applicable to other wireless technologies, such as Bluetooth. Furthermore, the term access point, as used herein, includes any wireless receiver or transceiver that utilizes credentials or other profile information in order to establish a wireless communications connection. In one embodiment, information handling system 100 can include a Bluetooth host device for establishing wireless communications with a Bluetooth compliant device. Alternatively, a Bluetooth host device can be incorporated within WLAN 150. Accordingly, another notification function can notify listener service 202 in the event that a connection manager associated with a Bluetooth host is being configured.

Figure 3:
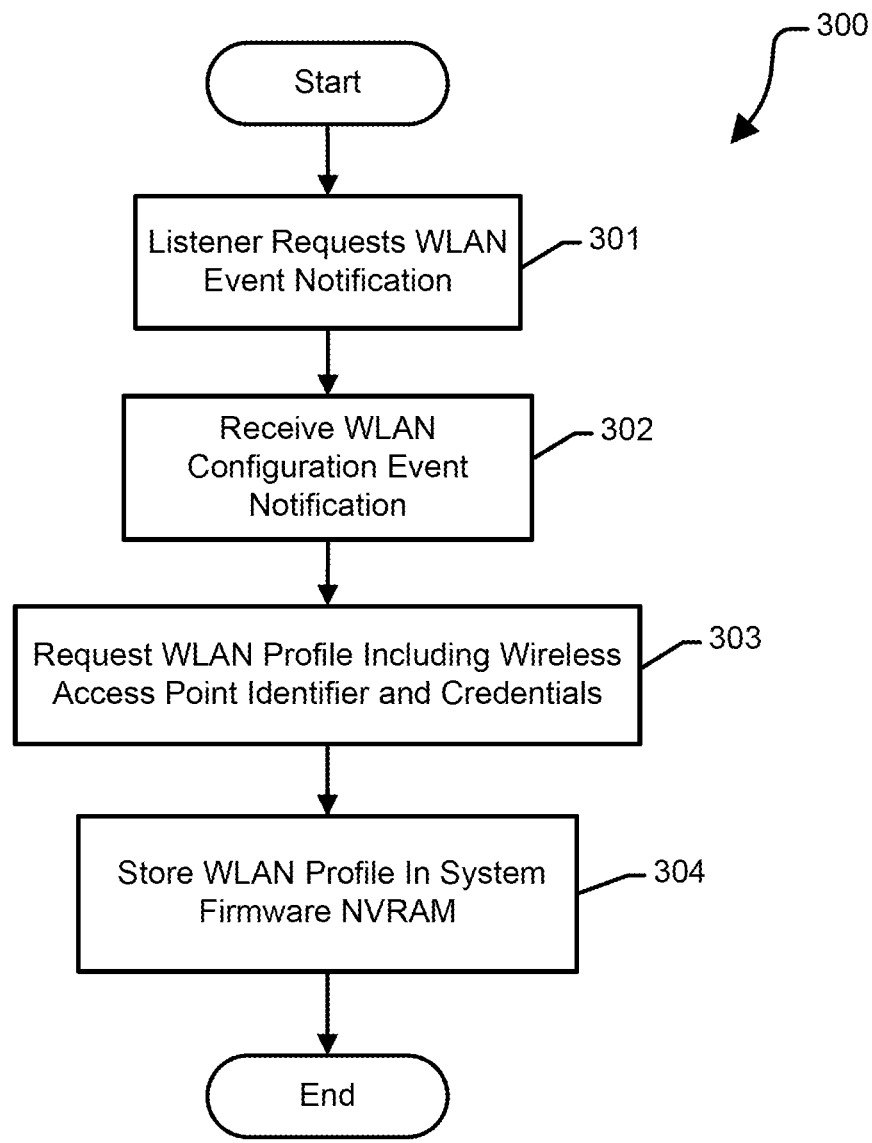
FIG. 3 is a flow diagram illustrating a method for storing wireless local area network information at a BIOS NVRAM according to a specific embodiment of the present disclosure.

FIG. 3 is a flow diagram illustrating a method 300 for storing wireless local area network information at a BIOS NVRAM according to a specific embodiment of the present disclosure. Method 300 begins at block 301 where a listener service requests WLAN event notification. For example, listener service 202 can register a request with the operating system at information handling system 100 to be notified when a user interacts with WLAN connection manager 152. The method continues at block 302 where the listener service receives a WLAN configuration event notification. For example, WLAN notification function 201 can alert listener service 202 that a user provided configuration information, or modified a previous configuration, of WLAN 150. The configuration information typically includes a name of a wireless access point and security credentials, or Wi-Fi access certificate, required to communicate with the access point. The method continues at block 303 where the listener service issues a request to the operating system for WLAN profile information including a wireless access point identifier and security credential. The method proceeds to block 304 where the listener service stores the WLAN profiles in a system firmware NVRAM. For example, listener service 202 can store the WLAN profile information at NVRAM 170, such as NVRAM data region 174.

Figure 4:
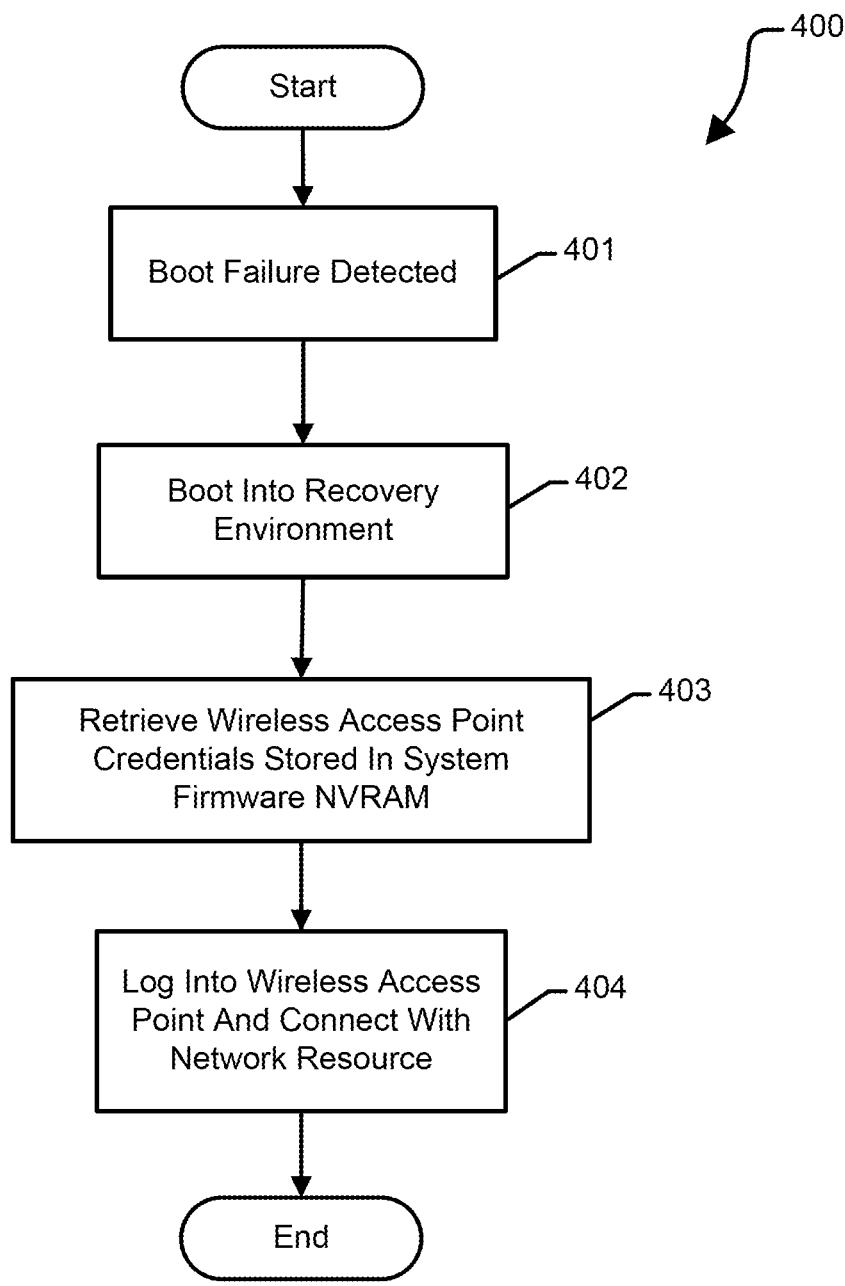
FIG. 4 is a flow diagram illustrating a method for retrieving wireless local area network information from a BIOS NVRAM according to a specific embodiment of the present disclosure.

FIG. 4 is a flow diagram illustrating a method 400 for retrieving wireless local area network information from a BIOS NVRAM according to a specific embodiment of the present disclosure. Method 400 begins at block 401 where a boot failure is detected at an information handling system. For example, the Windows operating system includes a boot flag register that can be used to notify firmware when a boot failure has occurred during a previous boot attempt. The method continues at block 402 where the firmware boots into a recovery environment. For example, information handling system 100 can include a recovery operating system that is configured to provide diagnostic or remediation services. The method continues at block 403 where the wireless access point profiles stored in system firmware NVRAM are retrieved. For example, BIOS code 172 or the recovery OS can retrieve WLAN configuration information from NVRAM data 174.

At block 404, the configuration information can be used to log in to a wireless access point and connect with a network resource. For example, the service OS can establish communications between WLAN 150 and a wireless network transceiver, such as a Wi-Fi compliant networking device. The service OS can download diagnostic tools from a remediation server via the Internet, pass control of information handling system 100 to a remote service entity, and the like, to determine a cause of the boot failure and to correct the problem. In one embodiment, method 400 can be performed without intervention from a user of information handling system 100. For example, the recovery environment does not need to prompt a user for Wi-Fi login credentials because the login information was previously stored at NVRAM data 174.

Figure 5:
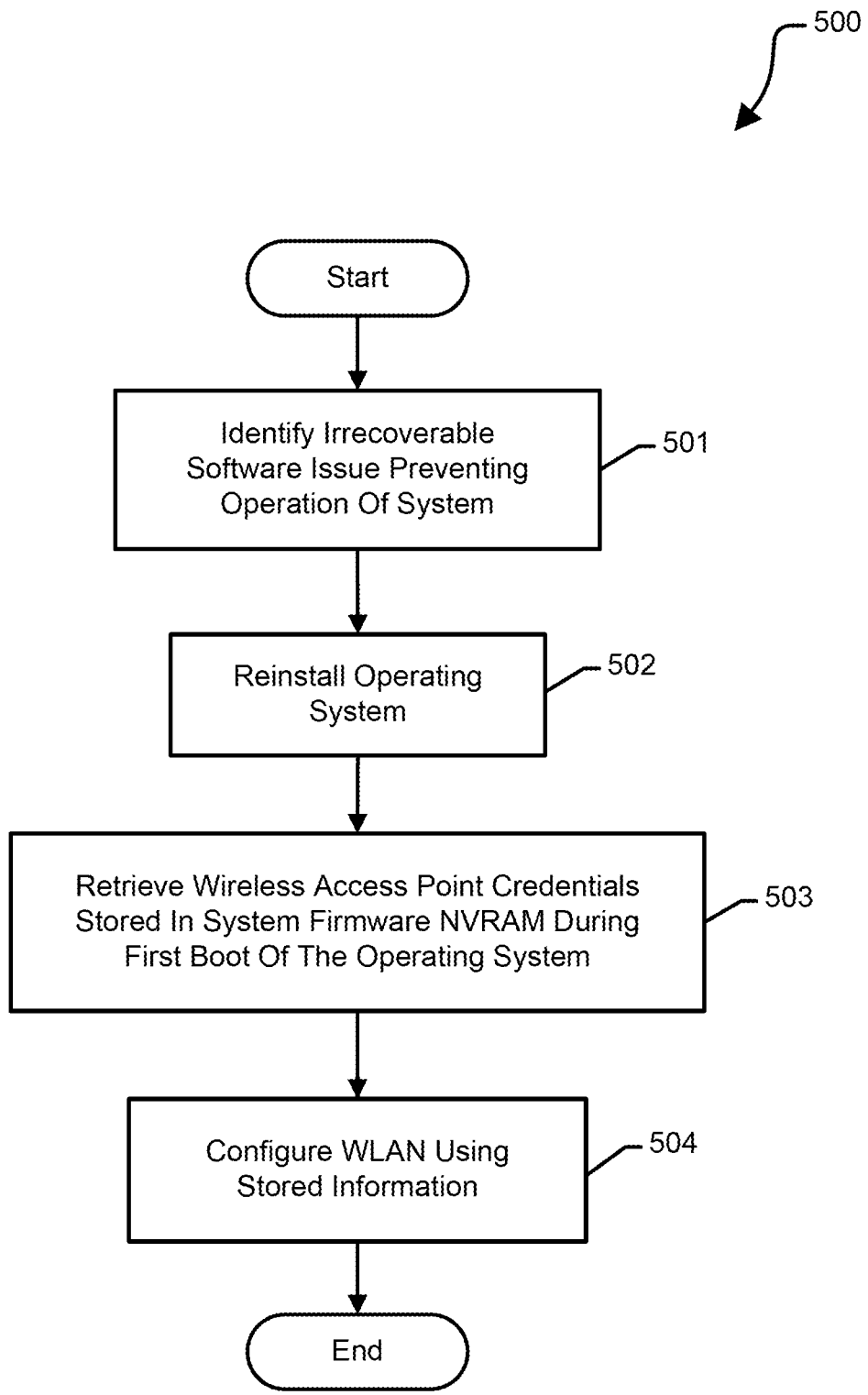
FIG. 5 is a flow diagram illustrating a method for retrieving wireless local area network information from a BIOS NVRAM according to another embodiment of the present disclosure The use of the same reference symbols in different drawings indicates similar or identical items.

FIG. 5 is a flow diagram illustrating a method 500 for retrieving wireless local area network information from a BIOS NVRAM according to another embodiment of the present disclosure. Method 500 begins at block 501 where an irrecoverable software issue preventing operation of an information handling system is identified. For example, diagnostic routines included at BIOS code 172 or remediation processes such as those described above with reference to FIG. 4 may fail to identify a cause of system inoperability, inability to properly boot an operating system can be due to an erroneous software or registry configuration, malicious software such as a computer virus, an incompatible device driver, and the like. Accordingly, diagnostic processes may determine that a reinstallation of the primary OS is required, as shown at block 502. The method continues at block 503 where wireless access point profiles stored at a system firmware NVRAM are retrieved during an initial boot of the OS. For example, BIOS code 172 can determine that a present boot event is the first time that a freshly-installed OS has been booted, and retrieve Wi-Fi or other WLAN configuration information from NVRAM data 174.

The method completes at block 504 where a WLAN controller is configured using the stored information. For example, the information stored at NVRAM data 174 can include an access point name identifying a particular Wi-Fi network, and a password necessary to connect to the network. One of skill will appreciate that WLAN configuration information can be stored at a system registry, at a program data directory maintained by the operating system, or the like. Accordingly, the WLAN configuration information is typically deleted when the operating system is reinstalled. In one embodiment, firmware can retrieve the WLAN configuration information stored at NVRAM data 174 in response to determining that information is no longer stored at the location maintained by the operating system. For example, a failure of a disk drive storing a primary operating system may require replacement of the failed drive, and reinstallation of the operating system. During a first boot of the new operating system, firmware can retrieve the WLAN configuration information stored at NVRAM data 174 and configure WLAN 150 to enable communications with the wireless access point.

Referring back to FIG. 1, the information handling system 100 can include a set of instructions that can be executed to cause the information handling system to perform any one or more of the methods or computer based functions disclosed herein. The information handling system 100 may operate as a standalone device or may be connected to other computer systems or peripheral devices, such as by a network.

In a networked deployment, the information handling system 100 may operate in the capacity of a server or as a client user computer in a server-client user network environment, or as a peer computer system in a peer-to-peer (or distributed) network environment. The information handling system 100 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single information handling system 100 is illustrated, the term "system" shall also be taken to include any collection of systems or sub-systems that individually or jointly execute a set, or multiple sets, of instructions to perform one or more computer functions.

The information handling system 100 can include a disk drive unit and may include a computer-readable medium, not shown in FIG. 1, in which one or more sets of instructions, such as software, can be embedded. Further, the instructions may embody one or more of the methods or logic as described herein. In a particular embodiment, the instructions may reside completely, or at least partially, within system memory 104 or another memory included at system 100, and/or within the processor 102 during execution by the information handling system 100. The system memory 104 and the processor 102 also may include computer-readable media. A network interface device (not shown at FIG. 1) can provide connectivity to a network, e.g., a wide area network (WAN), a local area network (LAN), or other network.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions or receives and executes instructions responsive to a propagated signal; so that a device connected to a network can communicate voice, video or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method comprising:
    receiving a system event notification corresponding to a change in configuration of a wireless local area network controller at an information handling system;
    requesting a wireless access point profile from the wireless local area network controller in response to receiving the system event notification, the profile including a wireless access point identifier and the wireless access point credentials;
    storing the wireless access point profile at a basic input output system (BIOS) non-volatile random-access memory (NVRAM);
    reinstalling an operating system at the information handling system:
    retrieving the wireless access point profile from the BIOS NVRAM in response to initiating a first boot of the reinstalled operating system; and
    providing the wireless access point profile to the wireless local area network controller, the wireless access point profile to enable access to network resources via the wireless local area network controller.

2. The method of claim 1, further comprising requesting notification of when the wireless access point profile at the wireless local area network controller is modified.

3. The method of claim 1, wherein the wireless access point profile includes a network security encryption key.

4. The method of claim 1, wherein the BIOS NVRAM is the primary device for storing boot firmware at an information handling system.

5. The method of claim 1, further comprising retrieving the wireless access point profile in response to determining the profile is no longer stored at a data storage device that contains the primary operating system installation.

6. A system comprising:
a wireless local area network controller; and
a non-volatile random-access memory (NVRAM) for storing a basic input output system (BIOS), the BIOS including instructions to:
receive a system event notification corresponding to a change in configuration of the wireless local area network controller;
request a wireless access point profile from the wireless local area network controller in response to receiving the system event notification, the profile including a wireless access point identifier and the wireless access point credentials;
store the wireless access point profile at the BIOS NVRAM;
identify a failure to load a primary operating system;
initiate a boot into a recovery operating system environment in response to identifying the failure:
retrieve the wireless access point profile from the BIOS NVRAM in response to initiating the boot into the recovery operating system environment; and
provide the wireless access point profile to the wireless local area network controller, the wireless access point profile to enable the system to access network resources via the wireless access point.

7. The system of claim 6, further comprising instructions to request notification of when the wireless access point profile at the wireless local area network controller is modified.

8. The system of claim 6, wherein the wireless access point profile includes a network security encryption key.

9. The system of claim 6, wherein the BIOS NVRAM is the primary device for storing boot firmware at an information handling system.

10. A non-transitory data storage medium storing instructions executable by a processor at an information handling system to cause the processor to:
receive a system event notification corresponding to a change in configuration of a wireless local area network controller at the information handling system;
request the wireless access point profile from the wireless local area network controller in response to receiving the system event notification, the profile including a wireless access point identifier and the wireless access point credentials;
store the wireless access point profile at a basic input output system (BIOS) non-volatile random-access memory (NVRAM);
reinstall an operating system at the information handling system;
retrieve the wireless access point profile from the BIOS NVRAM in response to initiating a first boot of the reinstalled operating system; and
provide the wireless access point profile to a wireless local area network controller, the wireless access point profile to enable the information handling system to access network resources via the wireless local area network controller.

11. The storage medium of claim 10, wherein the BIOS NVRAM is the primary device for storing boot firmware at an information handling system.

* * * * *